United States Patent [19]

Matsugi et al.

[11] Patent Number: 4,795,324
[45] Date of Patent: Jan. 3, 1989

[54] SCROLL-TYPE FLUID TRANSFERRING MACHINE WITH DEFORMABLE THRUST BEARING

[75] Inventors: Tetsuzo Matsugi; Tsutomu Inaba; Norihide Kobayashi, all of Wakayama, Japan

[73] Assignee: Mitsubishi Denki Kabushiki Kaisha, Tokyo, Japan

[21] Appl. No.: 89,336

[22] Filed: Aug. 25, 1987

Related U.S. Application Data

[62] Division of Ser. No. 935,295, Nov. 26, 1986, Pat. No. 4,761,122.

[30] Foreign Application Priority Data

Nov. 27, 1985 [JP] Japan ................... 60-268434
Nov. 27, 1985 [JP] Japan ................... 60-268433

[51] Int. Cl.[4] .............. F01C 1/04; F01C 21/02; F16C 17/04; F16C 27/02
[52] U.S. Cl. .................. 418/55; 418/57; 384/304
[58] Field of Search ........ 418/55, 57; 384/304, 384/306–308, 420, 425

[56] References Cited

U.S. PATENT DOCUMENTS

| | | |
|---|---|---|
| 801,182 | 10/1905 | Creux . |
| 3,994,636 | 11/1976 | McCullough et al. . |
| 4,065,279 | 12/1977 | McCullough . |
| 4,199,308 | 4/1980 | McCullough . |
| 4,674,963 | 6/1987 | Morishita et al. .......... 418/55 |
| 4,702,681 | 10/1987 | Inaba et al. . |

FOREIGN PATENT DOCUMENTS

| | | |
|---|---|---|
| 0065261 | 8/1985 | European Pat. Off. . |
| 3140512 | 4/1983 | Fed. Rep. of Germany . |
| 3614614 | 7/1986 | Fed. Rep. of Germany . |
| 985997 | 3/1951 | France .......... 384/420 |
| 57-173585 | 10/1982 | Japan .......... 418/55 |
| 58-117378 | 7/1983 | Japan . |
| 58-113593 | 7/1983 | Japan . |
| 58-116820 | 8/1983 | Japan . |
| 59-103980 | 6/1984 | Japan . |
| 59-110893 | 6/1984 | Japan . |
| 59-176483 | 10/1984 | Japan . |
| 480559 | 4/1937 | United Kingdom . |
| 2159884 | 12/1985 | United Kingdom . |

*Primary Examiner*—John J. Vrablik
*Attorney, Agent, or Firm*—Oblon, Fisher, Spivak, McClelland & Maier

[57] ABSTRACT

A scroll-type fluid transferring machine of an improved construction, in which the bottom surface of the base plate of the orbiting scroll member and the bearing surface of the thrust bearing are well adapted even under a thrusting force during compression of the operating fluid, such scroll-type fluid transferring machine having its feature such that the surface of the thrust bearing to support the base plate of the orbiting scroll member, or the surface of the base plate of the scroll member supported by the thrust bearing is slanted in the radial direction so as to form the surface thereof in a center-concaved shape, wherein the inner peripheral side is concaved with respect to the outer peripheral side at a very small distance in the axial direction, or that an axial projection which is concentric with the thrust bearing and has a narrow width in the radial direction is provided between the opposed surfaces of the thrust bearing and the bearing frame in the vicinity of the center part in the radial direction between the inner peripheral side and the outer peripheral side of the thrust bearing, and further space gaps are provided between the mutually opposed surfaces at the inner peripheral side and the outer peripheral side of the projection.

1 Claim, 7 Drawing Sheets

SCROLL-TYPE FLUID TRANSFERRING MACHINE WITH DEFORMABLE THRUST BEARING

This is a division of application Ser. No. 935,295, filed Nov. 26, 1986, U.S. Pat. No. 4,761,122.

BACKGROUND OF THE INVENTION

1. Field of the Invention:

This invention relates to a scroll-type fluid transferring machine to be used as a compressor such as a refrigerant compressor, an air compressor, and so forth; a fluid pump; a turbine expanding machine; and others.

2. Discussion of the Background:

In the following, explanations will be given as to the conventional scroll-type fluid transferring machine by taking a compressor as an example.

First of all, the principle of the scroll compressor will be explained briefly.

FIGS. 1(a) to 1(d) of the accompanying drawing illustrate the fundamental structural elements of the scroll compressor and the theory of its compression. In the drawing, a reference numeral 1 designates a stationary scroll member, a reference numeral 2 indicates an orbiting scroll member, a numeral 3 refers to an outlet port, and a numeral 4 refers to a compression chamber. A reference letter O designates a fixed point on the stationary scroll member 1, while a reference letter O' denotes a fixed point on the orbiting scroll member 2. Both stationary scroll member 1 and orbiting scroll member 2 are respectively in the form of a wrap 1a and a wrap 2a, each being constructed with an involute curve, an arc, and so forth of the same shape, but being in a mutually opposite winding direction.

In the following discussion, the operation of this type of the scroll compressor will be explained. The stationary scroll member 1 is in the stationary state with respect to the open space, while the orbiting scroll member 2 is combined with the stationary scroll member 1 and changes its position at the respective moving angles of 0°, 90°, 180° and 270°, as shown in FIGS. 1(a), 1(b), 1(c) and 1(d) respectively, without changing its posture with respect to the open space. With the movement of the orbiting scroll member 2, the compression chamber 4 in the form of a crescent defined between the wrap 1a of the stationary scroll member 1 and the wrap 2a of the orbiting scroll member 2 sequentially reduces its volume, whereby a gas confined in this compression chamber 4 is compressed and discharged from the outlet port 3. During this compression stroke, a distance between the fixed points O—O' in FIGS. 1(a) to 1(d) is maintained constant, and, if a space interval between the wraps is taken as a and the thickness of each of them is denoted as t, the distance (O—O') is represented as O—O'=a/2−t. Additionally, the space interval a corresponds to a pitch of the wrap.

The explanations given above are the outlines of the apparatus known as a scroll compressor.

In the following discussion, explanations will be given as to a concrete construction and operations of the conventional scroll compressor.

FIG. 2 is a side elevational view in longitudinal cross-section showing a compressing mechanical part of a conventional scroll compressor. In FIG. 2, a reference numeral 1 designates a stationary scroll member constructed with a wrap 1a such as in an involute form; a base plate (or ceiling plate) 1b, from one surface side of which the wrap 1a is projected downward; an outlet port 3 formed in one part of this base plate 1b; and an inlet port 5 formed in another part thereof. A numeral 2 refers to an orbiting scroll member constructed with a wrap 2a in the same shape as that of the wrap 1a of the stationary scroll member 1, but wound in an opposite direction to that of the wrap 1a; a base plate (or bottom plate) 2b, from one surface side of which the wrap 2a is projected outward; and a boss 13 projected downward from the other surface of the base plate 2b. A reference numeral 4 represents a compression chamber defined by the wrap 1a of the stationary scroll member 1, the base plate 1b, the wrap 2a of the orbiting scroll member 2, and the base plate 2b. A numeral 6 refers to a bearing frame, a numeral 7 refers to a thrust bearing provided on the bearing frame 6 to hold the bottom surface of the base plate 2b of the orbiting scroll member 2, and a numeral 8 refers to a main shaft having an eccentric bore 14, into which the boss 13 of the orbiting scroll member 2 is fitted in a freely rotatable manner. A reference numeral 9 denotes a rotation-preventing mechanism constructed with an Oldham's coupling, and so forth, which functions to prevent the orbiting scroll member 2 from its rotation around the boss 13 as its shaft and to cause it to revolve around the main shaft 8 as its crank shaft. A numeral 10 refers to a balancer. These are the principal components for the compression mechanical part of the scroll compressor. In this mechanical structure, the wrap 2a of the orbiting scroll member 2 and the wrap 1a of the stationary scroll member 1 are fitted together in a mutually opposite relationship, and the boss 13 of the orbiting scroll member 2 is fitted into the eccentric bore 14 of the main shaft 8. The main shaft 8 is supportively fitted in the bearing frame 6 in a freely rotatable manner, both bearing frame 6 and the stationary scroll member 1 being coupled together with screw-threaded bolts, etc. (not shown in the drawing). Furhter, the upper surface of the thrust bearing 7 mounted on the bearing frame 6 and the bottom surface of the base plate 2b of the orbiting scroll member 2 opposite to the wrap 2a come into contact each other. The balancer 10 is fixed on one part of the main shaft 8 by pressing-fitting.

FIG. 3(a) through 6(b) are schematic diagrams for explaining the function of various thrust bearing sliding parts of conventional scroll compressors, wherein FIGS. 3(a), 4(a), 5(a) and 6(a) respectively illustrate a state, in which a gas pressure is not present in the compressor before or after its operation, while FIGS. 3(b), 4(b), 5(b) and 6(b) respectively show a state, in which the base plate 2a of the orbiting scroll member 2 is deformed by a thrust load imparted to it during operation of the compressor. It should be noted that, throughout FIGS. 3(a) to 6(b), reference letters $\delta_1$ to $\delta_3$ denote a quantity of displacement of the base plate 2b of the orbiting scroll member 2 or a difference in height in the axial direction between the inner peripheral side and the outer peripheral side of hte thrust bearing 7.

FIGS. 3(a) and 3(b) illustrate a case, wherein the bottom surface of the base plate 2b of the orbiting scroll member 2 constituting the sliding surface with the upper surface of the thrust bearing 7 (in other words, the upper surface of the thrust bearing 7 constituting the sliding surface with the bottom surface of the above-mentioned base plate 2b) is perpendicular to the direction of the axis, in the form of their constituent parts; that is to say, the inner peripheral side and the outer peripheral side of the thrust bearing constituting the sliding surface are in the horizontal plane.

FIGS. 4(a) and 4(b) illustrate a case, wherein the inner peripheral side of the upper surface of the thrust bearing 7 is in the form of a center-convex by an amount $\delta_2$ with respect to the outer peripheral side thereof.

FIGS. 5(a) and 5(b) illustrate a case, wherein the bottom surface of the base plate 2b of the orbiting scroll member 2 is in a center-convexed shape at the inner peripheral side of the thrust bearing 7 by an amount $\delta_3$ with respect to the outer peripheral side thereof as shown in more detail in FIG. 7.

FIGS. 6(a) and 6(b) show a state, in which the upper surface of the thrust bearing 7 is in a center-convexed shape by an amount $\delta_2$ as is the case with FIGS. 4(a) and 4(b), and, at the same time, the bottom surface of the base plate 2b of the orbiting scroll member 2 is in the center-convexed shape by an amount $\delta_3$ as is the case with FIGS. 5(a) and 5(b).

Incidentally, it should be noted that each of FIGS. 3(a) through 7 is exaggerated in its illustration of the thrust bearing 7 and the base plate 2b of the orbiting scroll member 2 in their axial direction for better understanding of the explanations.

In the following discussion, an explanation will be made as to the operations of the scroll compressor which is constructed in the above-described manner. When a rotational torque is transmitted from the drive part such as an electric motor, and so forth (not shown in the drawing) to the main shaft 8 to start its rotation, the orbiting scroll member 2 commences its turning. In this case, however, since the orbiting scroll member 2 is prevented from its rotation by the rotation-preventing mechanism 9 provided on it, both stationary scroll member 1 and orbiting scroll member 2 function to compress the operating fluid on the basis of the principle of compression as described in the foregoing in reference to FIG. 1. In this instance, the orbiting scroll member 2 perform its eccentric revolution, the static and dynamic balancing of which is done by the balancer 10. Further, in such scroll compressor, there occurs a thrusting force which tends to separate the stationary scroll member 1 and the orbiting scroll member 2 in the axial direction during compression of the operating fluid. This thrusting force is undertaken by holding the bottom surface of the base plate 2b of the orbiting scroll member 2 on the upper surface of the thrust bearing 7 provided on the bearing frame 6.

The conventional scroll compressor as constructed in the above-described manner increases the fluid pressure towards the center of both stationary and orbiting scroll members during its operation as will be understandable from the operating principle of the scroll compressor shown in FIG. 1, whereby the base plate 2b of the orbiting scroll member 2 is deformed ithe center-convexed shape by an amount $\delta_1$, for example, owing to a load exerted by the compressed gas, as shown in FIG. 3(b). On account of this, the bottom surface of the base plate 2b of the orbiting scroll member 2 and the inner peripheral edge of the upper surface of the thrust bearing 7 bring about concentrated sliding contact. By this phenomenon taking place during the operation of the compressor, this sliding part becomes apt to readily bring about abnormal wear or seizure with the consequent various problems to occur such that the compressor is damaged, mechanical loss of the compressor increases, and so on. Such sliding phenomenon appears consequently when the upper surface of the thrust bearing or the base plate 2b of the orbiting scroll member 2 is in the center-convexed shape at its inner peripheral side with respect to the outer peripheral side thereof owing to its state at the time of machining, etc. as shown in FIGS. 4(a), 4(b), 5(a) and 5(b), or when both upper surface of the thrust bearing 7 and bottom surface of the base plate 2b are in the center-convexed shape at their inner peripheral side with respect to the outer peripheral side, all these having been liable to bring about abnormal friction, seizure and other undesirable phenomena in the thrust bearing.

SUMMARY OF THE INVENTION

The present invention aims at solving the problems mentioned above, and, more particularly, seeks to provide a scroll-type fluid transferring machine such as scroll compressor, etc. which has high operational reliability at its bearing part, and in which the bottom surface of the base plate of the orbiting scroll member and the bearing surface of the thrust bearing are well adapted, even under a thrusting force imparted thereto during operation of the scroll-type fluid transferring machine, i.e., during compression of the operating fluid.

That is to say, the scroll-type fluid transferring machine according to the present invention, in one aspect of it, is constructed with a stationary scroll member and an orbiting scroll member, each being in the shape of wrap formed by an involute curve, etc. and being projectively attached onto a base plate to define a compression chamber by combining them in a manner to mutually offset said helices; a main shaft for transmitting drive force from a prime mover such as an electric motor to said orbiting scroll member; a bearing frame which holds said orbiting scroll member and said main shaft to share to thrust load to be imparted to each of them; a thrust bearing provided on said bearing frame and functioning to hold said base plate of said orbiting scroll member and a rotation-preventing mechanism to prevent said orbiting scroll member from its rotation around the axis and to cause the same to revolve around said main shaft, wherein the surface of said thrust bearing holding the base plate of said orbiting scroll member, or the surface of said base plate of said orbiting scroll member held by said thrust bearing is slanted in the radial direction so as to form the surface thereof in a center-concaved shape, wherein the inner peripheral side is concaved with respect to the outer peripheral side at a very small distance in the axial direction.

Moreover, the scroll-type fluid transferring machine according to the present invention, in another aspect of it, is constructed with a stationary scroll member and an orbiting scroll member, each of which is in the form of a wrap such as an involute curve, etc. and which is projectively attached onto a base plate to define a compression chamber by combining them in a manner to mutually offset said wraps; a main shaft for transmitting drive force from a prime mover such as an electric motor to said orbiting scroll member; a bearing frame which holds said orbiting scroll member and said main shaft to share a thrust load to be imparted to each of them; a thrust bearing provided on said bearing frame and functioning to hold said base plate of said orbiting scroll member; and a rotation-preventing mechanism to prevent said orbiting scroll member from its rotation around its axis and to cause the same to revolve around said main shaft, wherein at least one axial projection concentric with said thrust bearing and having a narrow width in the radial direction is provided between the opposed surfaces of said thrust bearing and said bearing frame in the vicinity of the center part in the radial direction between the inner peripheral side and the outer peripheral side of said thrust bearing, and a space gap is provided at the inner peripheral side and the outer peripheral side of the projection between said mutually opposed surfaces.

BRIEF DESCRIPTION OF THE DRAWINGS

Various ways of carrying out the invention are described in detail hereinbelow with reference to the accompanying drawings which illustrate a few preferred embodiments, in which.

DETAILED DESCRIPTION OF THE PREFERRED EMBODIMENTS

In the following description, the present invention will be described in reference to FIGS. 8 through 10(b) showing one embodiment of the present invention.

Figure 1:
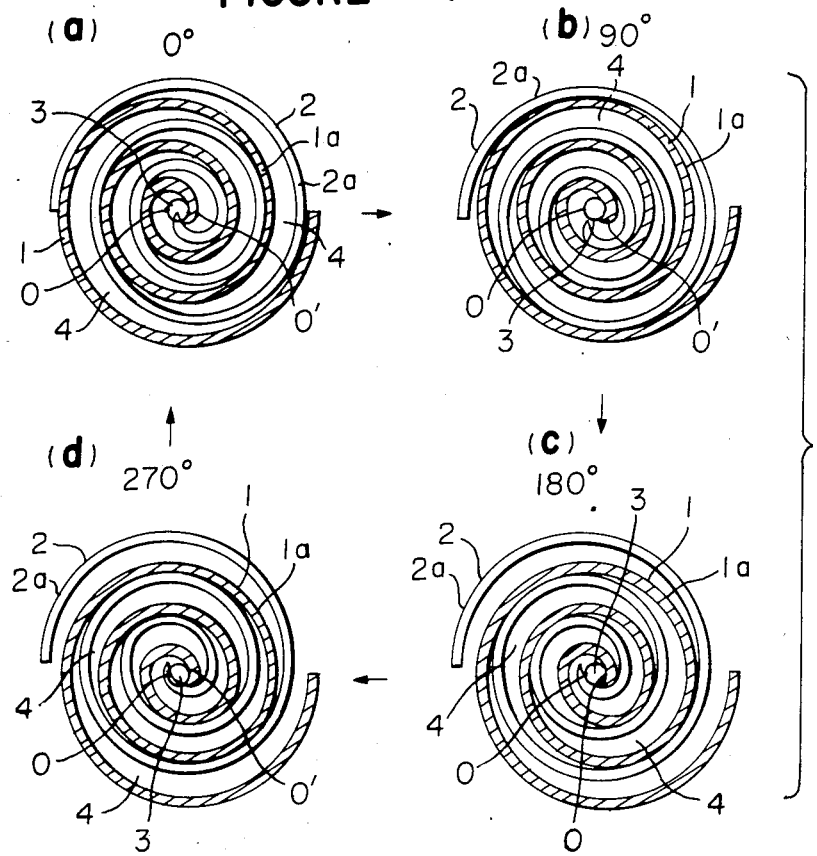
FIGS. 1(a), 1(b), 1(c) and 1(d) are respectively schematic illustrations showing the operating principle of the scroll compressor, in which it is in different operating conditions.
Figure 2:
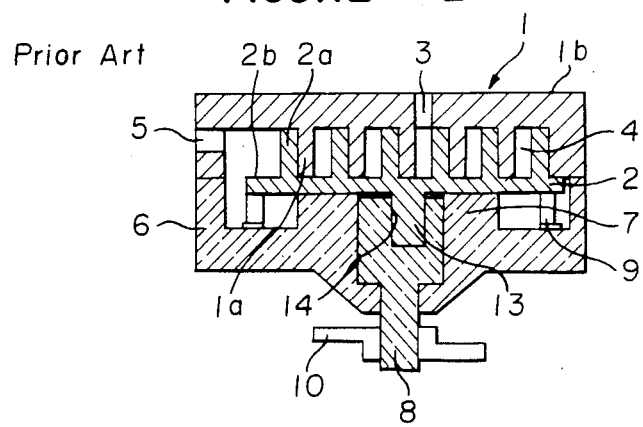
FIG. 2 is a side elevational view in longitudinal cross-section showing the compression mechanical part of the conventional scroll compressor.
Figure 3A:
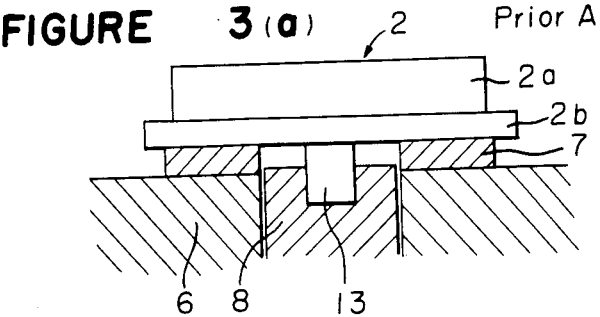
FIG. 3(a), 4(a), 5(a) and 6(a) are respectively schematic illustrations for explaining the functions of different thrust bearings of the conventional scroll compressor in their non-operating state.
Figure 3B:
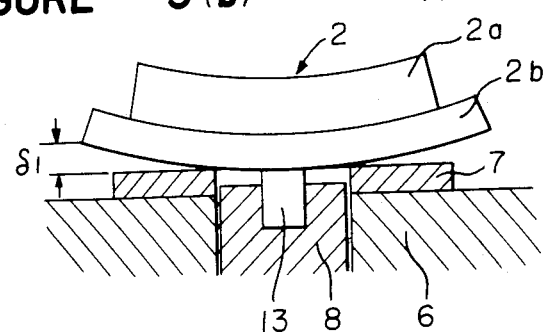
FIG. 3(b), 4(b), 5(b) and 6(b) are respectively schematic illustrations for explaining the functions of different thrust bearing of the conventional scroll compressor in their operating state.
Figure 4A:
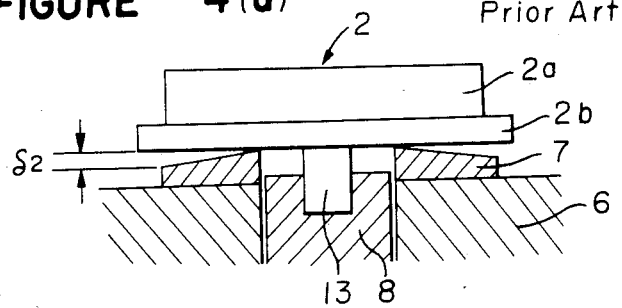
Figure 4B:
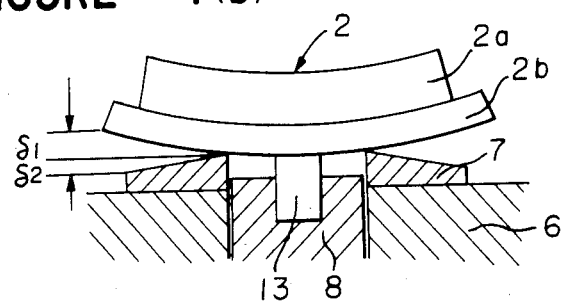
Figure 5A:
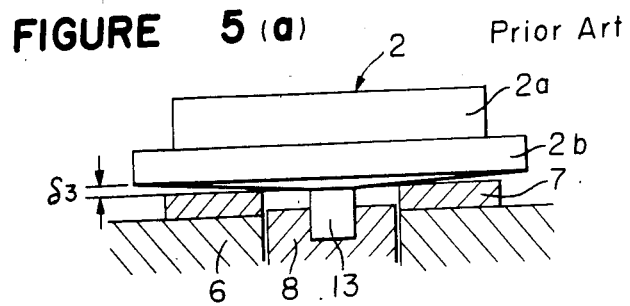
Figure 5B:
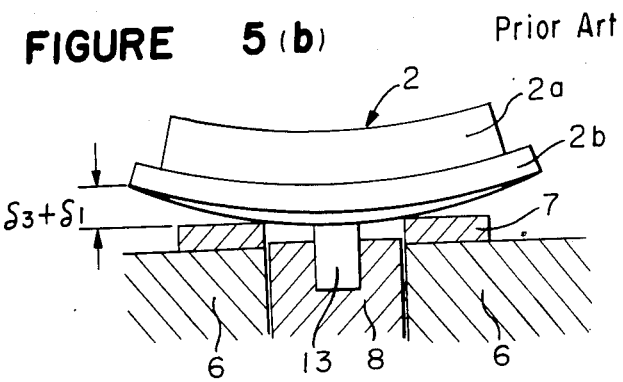
Figure 6A:
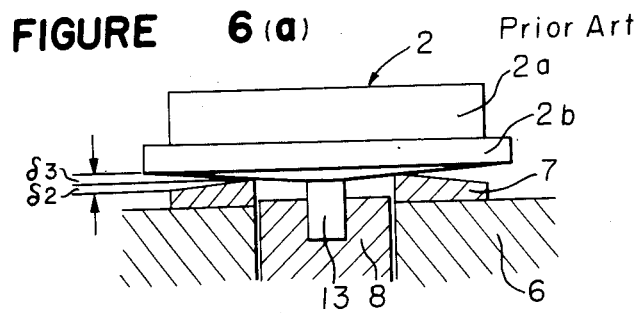
Figure 6B:
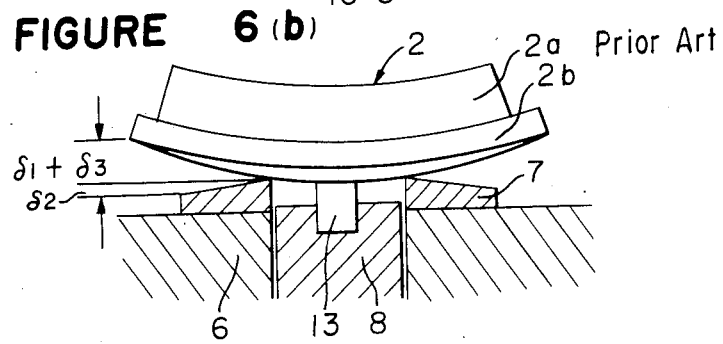
Figure 7:
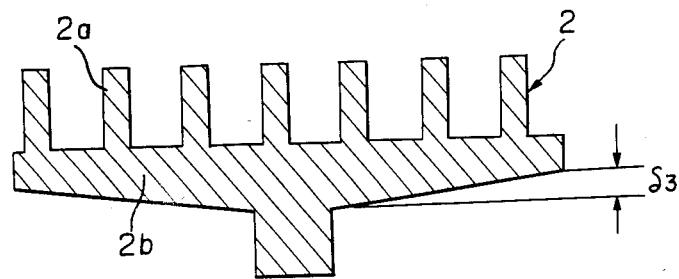
FIG. 7 is a side elevational view in longitudinal cross-section showing the orbiting scroll member used in the embodiment of FIGS. 6(a) and 6(b)
Figure 8:
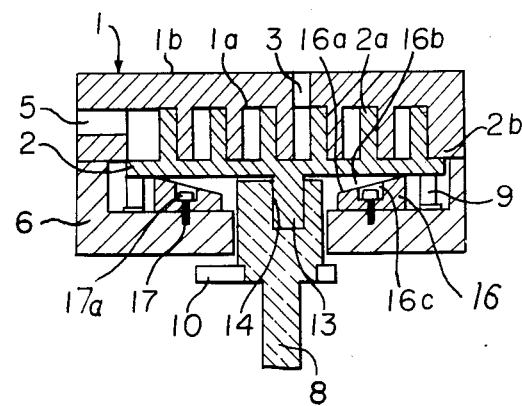
FIG. 8 is a side elevational view in longitudinal cross-section showing the compression mechanical part of the scroll compressor according to one embodiment of the present invention.
Figure 9:
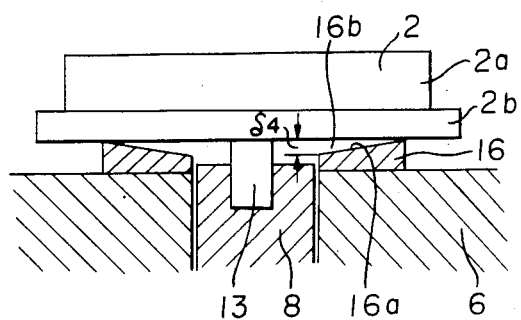
FIG. 9(a), 9(b) and 9(c) are schematic illustrations for explaining the functions of the same scroll compressor of FIG. 8 in its different states.
Figure 9:
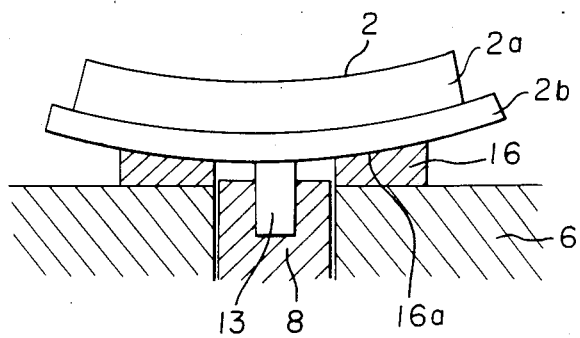
Figure 9:
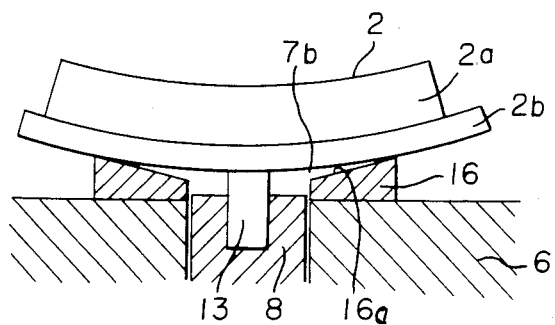

Referring to FIG. 8, in which the same reference numerals as those in FIG. 2 designate the same or corresponding parts, a numeral 16a refers to the upper surface of a thrust bearing 16 separately formed from the bearing frame 6. This upper surface 16a is slanted in the radial direction; that is to say, it is machined to have a center-concaved shape, wherein its inner peripheral side is concaved for a very small distance of from 10 to 20 $\mu$m downward in the axial direction with respect to its outer peripheral side. A numeral 16b refers to a space gap between the upper surface 16a of the thrust bearing 16 and the lower surface of the base plate 2b of the orbiting scroll member 2, the space gap being formed at the time of assembly of these parts. A numeral 17 refers to a screw-threaded bolt for fixing the thrust bearing 16 onto the upper surface of the bearing frame 6. In order that the head 17a of this screw-threaded bolt 17 may not project from the upper surface 16a of the thrust bearing 16, a recessed part 16c to receive the head 17a of the screw-thereaded bolt 17 therein is formed in one part of this upper surface 16a.

Figure 10A:
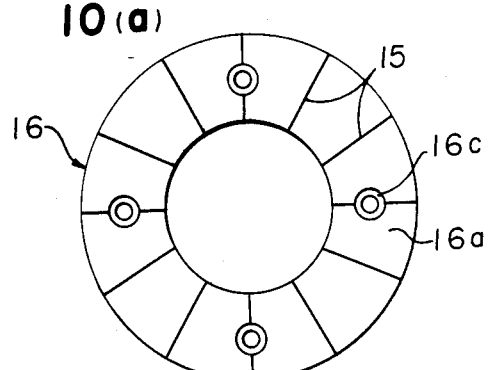
FIG. 10(a) and 10(b) are respectively a plan view and a longitudinal cross-sectional view of the thrust bearing for the same scroll compressor as shown in FIG. 8.
Figure 10B:
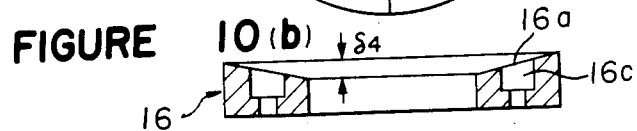

FIGS. 10(a) and 10(b) are respectively a plan view and a longitudinal cross-sectional view of the thrust bearing. In FIG. 10(a), a reference numeral 15 refers to grooves for lubricating oil which are radially formed on the upper surface of the thrust bearing 16.

FIGS. 9(a), 9(b) and 9(c) are schematic illustrations for explaining the function of the sliding part of the thrust bearing in this first embodiment of the present invention, in which FIG. 9(a) shows a state wherein no gas pressure is existent in the scroll compressor, and FIGS. 9(b) and 9(c) show respectively the states wherein the base plate 2b of the orbiting scroll member 2 is deformed at the time of the thrust load being imparted to it. It should be noted that the construction of the scroll compressor in this first embodiment other than those as described above is similar to that of the conventional scroll compressor shown in FIG. 2.

In this embodiment of the scroll compressor of the construction as described above, the thrust bearing 16 is formed in the center-concaved shape as shown in FIG. 9(a) so that, when the base plate 2b of the orbiting scroll member 2 is deformed by the thrust load to be generated at the time of compression of the gas during the operation of the compressor, the bottom surface of the base plate 2b may be deformed in the center-convexed shape. With this construction, the inner peripheral edge of the upper surface 16a of the thrust bearing 16 becomes able to support the bottom surface of the base plate 2b in the state of its being deformed by the gas pressure, and wiht a large bearing area, but without its coming into the concentrated contact with the bottom surface of the base plate 2b of the orbiting scroll member 2 as shown in FIG. 9(b). At this instant, there may be a possibility of the contact of the outer peripheral side taking place at the sliding surface between the bottom surface of the base plate 2b of the orbiting scroll member 2 and the upper surface 16a of the thrust bearing 16, depending on the gas pressure, as shown in FIG. 9(c). However, since the bearing area is proportionate to the square of the radius, if a ratio of the inner diameter to the outer diameter of the thrust bearing 16 is assumed to be 1:2, the effective bearing area of the upper surface 16a of the thrust bearing 16 becomes four times as large as the conventional sliding at the inner peripheral edge, whereby its capacity for the bearing load can be remarkably improved. It should, however, be noted here that, when the height $\delta_4$ of the upper surface 16a of the thrust bearing 16 in the center-concaved shape assumes a value ten times or more, for example, as large as the absolute value $\delta_1$ of the height of the base plate 2b of the orbiting scroll member 2 to be deformed by the thrust load, the upper surface 16a of the thrust bearing 16 performs the sliding with the above-mentioned base plate 2b at the outer peripheral side thereof during operation of the compressor to thereby bring about abnormal friction or seizure. Consequently, the upper limit of the height $\delta_4$ of the center-concaved upper surface 16a is required to be kept three to four times as high as the absolute height $\delta_1$.

Figure 11:
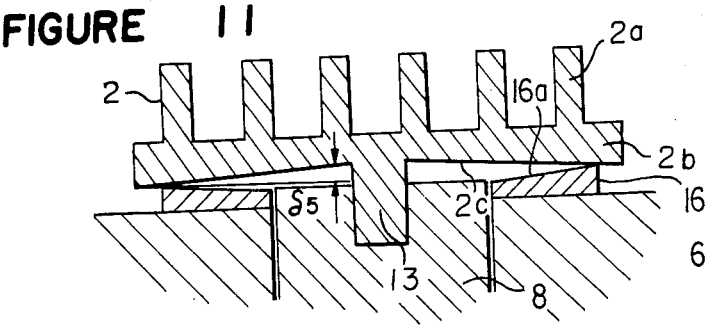
FIG. 11 is a side elevational view in longitudinal cross-section showing the orbiting scroll member for the scroll compressor in accordance with another embodiment of the present invention.

FIG. 11 is a side elevational view in longitudinal cross-section of the orbiting scroll member according to the second embodiment of the present invention. In this embodiment, the bottom surface 2c of the base plate 2b of the orbiting scroll member 2 is made to assume a center-concaved shape with the inner peripheral side thereof being concave by about 10 $\mu$m with respect to the outer peripheral side. (Incidentally, its should be noted that the construction of the scroll compressor in this embodiment other than those as described in the preceding is similar to that as shown in FIG. 2.) In this second embodiment, too, there can be obtained the same resulting effect as that in the embodiment shown in FIGS. 8 to 10(b), wherein the above-mentioned bottom surface 2c prevents the upper surface of the thrust bearing from performing contact with the inner peripheral edge.

Further, in the present invention, the thrust bearing may be integrally formed with the bearing frame. Furthermore, the present invention may be applied not only to the scroll compressor in the above-described embodiment, but also to the fluid pumps, turbine compressors, and so forth.

As has been described in the foregoing, the scroll-type fluid transferring machine according to the present invention is so formed that the supporting surface of the thrust bearing for the orbiting scroll member or the surface of the orbiting scroll member to be supported by the thrust bearing is slanted in the radial direction to assume a center-concaved shape, such that consequently that there can be derived such effects that the one-side sliding contact of the upper surface of the thrust bearing to the inner peripheral edge due to deformation of the base plate of the orbiting scroll member during compression of the fluid can be eliminated, whereby damage to the machine due to the abnormal wear and seizure at the sliding part, as well as increase in the mechanical loss can be prevented.

FIGS. 12 to 14(c) illustrate the third embodiment of the present invention. In this embodiment, the thrust bearing and the base plate of the orbiting scroll member do not bring about the concentrated contact irrespective of the deformation of the base plate of the orbiting scroll member due to the thrust load exerted by the compressed gas during the operation of the compressor, or irrespective of whether the shape of the sliding surface of the base plate of the orbiting scroll member is center-convexed or center-concaved at its inner peripheral side with respect to the outer peripheral side, thereby relaxing the machining tolerance of the above-mentioned base plate.

Figure 12:
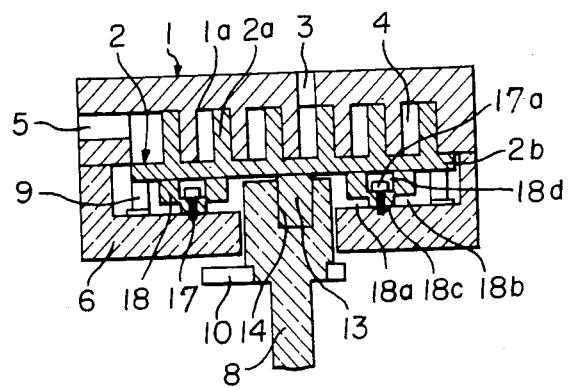
FIG. 12 is a side elevational view in longitudinal cross-section showing the compression mechanical part of the scroll compressor in accordance with still another embodiment of the present invention.
Figure 13:
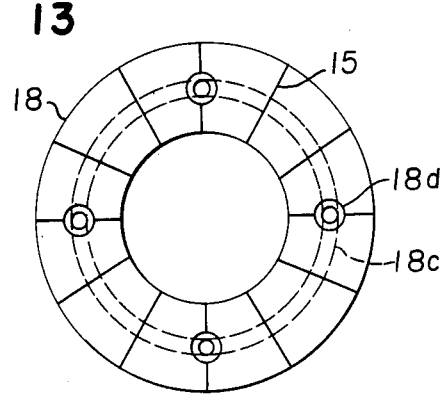
FIG. 13 is a plan view of the thrust bearing for the same scroll compressor as shown in FIG. 12.

FIG. 12 is a side elevational view in longitudinal cross-section showing the compression mechanical part of this third embodiment. In the drawing, the same reference numerals as those in FIG. 8 designate the corresponding parts. In this embodiment, the thrust bearing 18 and the bearing frame 6 are separately constructed, and a projection 18c concentric with them is projected in the axial direction from the bottom surface of the thrust bearing 18, with which it is integrally formed. The projection 18c, as shown in FIG. 13, is disposed at the center part in the radial direction between the inner peripheral side and the outer peripheral side of the thrust bearing 18 with its width being made narrow in its projecting direction with respect to its radius. The thrust bearing 18 is fastened to the upper surface of the bearing frame 6 with a screw-threaded bolt 17 passing through the projection 18c of the thrust bearing 18 in the axial direction. The lower end surface of the projection 18c is held on the upper surface of the bearing frame 6. Moreover, a recessed part 18d is formed in one part of the upper surface of the thrust bearing 18, in which a head 17a of the screw-threaded bolt 17 is housed, and also, space gaps 18a and 18b are respectively formed between the opposed surfaces of the thrust bearing 18 and the bearing frame 6 at the inner peripheral side and the outer peripheral side of the projection 18c.

FIG. 13 is a plan view of the thrust bearing 18, on the upper surface of which grooves 15 for lubricating oil are radially formed.

Figure 14A:
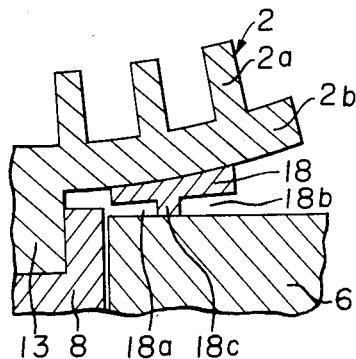
FIG. 14(a) and 14(b) are schematic fragmentary views in longitudinal cross-section for explaining the function of the thrust bearing in FIG. 13 in its different state.
Figure 14B:
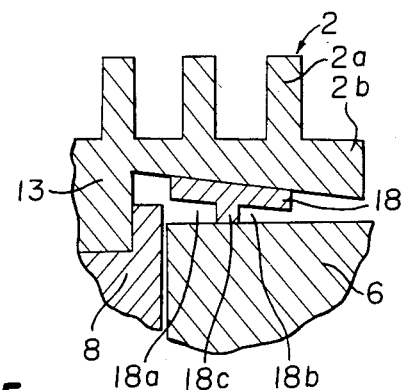

FIGS. 14(a) and 14(b) are fragmentary side elevational views in longitudinal cross-section showing the function of the sliding part between the thrust bearing 18 and the base plate 2 of the orbiting scroll member 2 according to this embodiment. (It should be noted incidentally that the construction of this embodiment other than those mentioned in the preceding is similar to that in FIG. 2.)

In the scroll compressor according to this embodiment of the present invention in its construction as described above, the gas confined in it is compressed during its running; and, when the base plate 2b of the orbiting scroll member 2 is deformed by the thrusting force generated from the compression, the thrust bearing 18 to be subjected to this thrusting force is also deformed in the center-concaved shape so as to follow the deformation in the base plate 2b of the orbiting scroll member 2 with the consequence that no concentrated contact takes place at the sliding part between the bottom surface of the base plate 2b and the top surface of the thrust bearing 18. Further, when machining the orbiting scroll member 2, if the bottom surface of the base plate 2b of the orbiting scroll member 2 is formed in the center-concaved shape at its inner peripheral side with respect to its outer peripheral side as shown in FIG. 11, the thrust bearing 7 is deformed so as to conform to the shape of the sliding surface thereof, even before the bottom surface of the base plate 2b has not yet been deformed by the compressed gas, with the result that no one-sided contact is brought about at the outer peripheral edge of the above-mentioned sliding surface.

Figure 15:
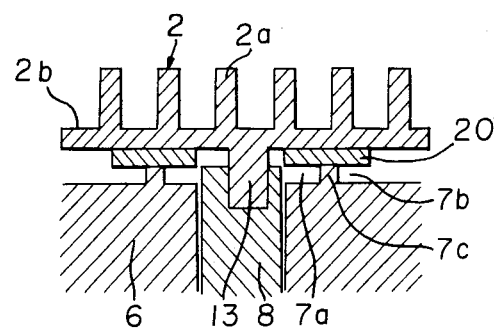
FIG. 15 is a side elevational view in longitudinal cross-section showing the main part of the scroll compressor in accordance with other embodiment of the present invention.

FIG. 15 illustrates the scroll compressor according to the fourth embodiment of the present invention, in which a projection 7c concentric with the thrust bearing 20 is projectively provided on the bearing frame 6, but not on the thrust bearing per se, the rest of the construction being the same as that shown in FIG. 12.

With this embodimental construction, too, the same resulting effect as that obtained with the embodiment of FIG. 12 can be realized.

In the present invention, the thrust bearing may be coupled with one of any appropriate connecting means such as pin, fitting, etc. other than the screw-threaded bolt for the bearing frame, or it may be formed integrally with the bearing frame. Further, the present invention may also be applied to various scroll-type fluid transferring machine such as fluid pumps, turbine expanders, etc. other than the scroll compressor.

As has been explained in the foregoing, the scroll-type fluid transferring machine according to the present invention has the axial projection, which is concentric with the thrust bearing and has a narrow width in the radial direction, provided between the opposed surfaces of the thrust bearing and the bearing frame in the vicinity of the center part in the radial direction between the inner peripheral side and the outer peripheral side of the thrust bearing, and further has space gaps provided at the inner peripheral side and the outer peripheral side of the projection positioned between these opposed surfaces. With such construction, therefore, when the base plate of the orbiting scroll member is deformed by a load in the thrusting direction during compression of the fluid, the space gap between the inner peripheral side and the outer peripheral side of the projection of the thrust bearing and the bearing frame is slightly deformed, which in turn causes the thrust bearing to deform to follow the deformation of the base plate, with the consequence that, whatever the shape of the sliding surface of the base plate of the orbiting scroll member might be, there can be obtained various effects such that the thrust bearing and the sliding part of the above-mentioned base plate does not bring about the one-sided contact, that the damage to the machine and increase in the mechanical loss due to abnormal wear, seizure etc. of the sliding part can be prevented, and further that the machining tolerance on the sliding surface of the base plate of the orbiting scroll member can be relaxed.

Obviously, numerous modifications and variations of the present invention are possible in light of the above teachings. It is therefore to be understood that within the scope of the appended claims, the invention may be practiced otherwise than as specifically described herein.

We claim:

1. A scroll-type fluid transferring machine provided with a stationary scroll member and an orbiting scroll member, each being in the shape of a wrap formed by an involute curve or the like and being projectively attached onto a base plate to define a compression chamber by combining them in a manner to mutually offset said wrap; a main shaft for transmitting drive force from a prime mover such as an electric motor to said orbiting scroll member; a bearing frame to hold said orbiting scroll member and said main shaft for sharing a thrust load to be imparted to each of them; a thrust bearing mounted on said bearing frame for supporting said base plate of said orbiting scroll member; and a rotation-preventing mechanism to prevent said orbiting scroll member from rotation around its axis and to cause it to revolve around said main shaft, said fluid transferring machine being characterized in that an axial projection, which is integral with and concentric with said thrust bearing and has a narrow width in the radial direction is fixed to said bearing frame and is provided between the opposed surfaces of said thrust bearing and said bearing frame in the vicinity of the center part in the radial direction between the inner peripheral side and the outer peripheral side of said thrust bearing, said axial projection being annular and extending in an axial direction from a bottom surface of said thrust bearing and that space gaps are provided between said mutually opposed surfaces at the inner peripheral side and the outer peripheral side of the projection.

* * * * *